United States Patent [19]

Solomon et al.

[11] Patent Number: 4,568,052
[45] Date of Patent: Feb. 4, 1986

[54] APPARATUS FOR SUPPORTING AN OBJECT IN A DESIRED POSITION

[75] Inventors: Jack Solomon, Long Beach; Robert E. Hawes, Huntington; Manfred O. Herbst, Levittown; William G. Eckert, Massapequa Park, all of N.Y.

[73] Assignee: Esselte Pendaflex Corporation, Garden City, N.Y.

[21] Appl. No.: 436,293

[22] Filed: Oct. 25, 1982

[51] Int. Cl.[4] .............................................. E04G 3/00
[52] U.S. Cl. .................................. 248/281.1; 248/447
[58] Field of Search .................. 248/280.1, 281.1, 291, 248/123.1, 585, 586, 587, 447, 462, 447.2

[56] References Cited

U.S. PATENT DOCUMENTS

| | | | |
|---|---|---|---|
| 436,717 | 9/1890 | Moore | 248/291 X |
| 967,877 | 8/1910 | Bauer | 248/281.1 |
| 1,282,489 | 10/1918 | Strodel | 248/291 X |
| 2,667,317 | 1/1954 | Trebules | 248/291 X |
| 3,638,889 | 2/1972 | Samuelson | 248/291 X |
| 4,003,536 | 1/1977 | Sekerich | 248/585 |
| 4,165,530 | 8/1979 | Sowden | 248/280.1 X |
| 4,447,031 | 5/1984 | Souder | 248/280.1 |

FOREIGN PATENT DOCUMENTS 120302 9/1945 Australia .......................... 248/281.1

*Primary Examiner*—Ramon S. Britts
*Assistant Examiner*—David M. Purol
*Attorney, Agent, or Firm*—Darby & Darby

[57] ABSTRACT

Each arm of a first pair of arms is pivotally connected at spaced-apart pivot locations to a first clamp bracket and to an adjustment bracket, respectively, and each arm of a second pair of arms is pivotally connected at spaced-apart locations to a second clamp bracket and to the adjustment bracket, respectively. A first control is engageable with an arm of the first pair for selectively enabling and preventing pivoting movement thereof, and a second control is engageable with an arm of the second pair for selectively enabling and preventing pivoting movement thereof. When the first and second controls both enable the respective pivoting movements, the second clamp bracket can be moved to a desired position, and, when the first and second controls both prevent the respective pivoting movement, the second clamp bracket retains its position.

4 Claims, 3 Drawing Figures

APPARATUS FOR SUPPORTING AN OBJECT IN A DESIRED POSITION

BACKGROUND OF THE INVENTION

This invention relates to apparatus for supporting an object in a desired position and, more particularly, to novel and highly-effective apparatus whereby the position of copy or of a lamp, etc., can be easily and accurately adjusted without the aid of tensioning springs or the like.

There is often a need to adjust the position of copyholders, lamps, etc. In the case of copyholders, where one must read the copy held, the position selected will depend on factors including the size of the type to be read, the direction and intensity of the lighting, and the reflectiveness of the copy. In the case of lamps, the position selected will depend on factors including the intensity of the light produced by the lamp, the presence or absence of additional sources of light, and (in the case of a spotlight) the area of the spot at the distance of the object illuminated. In both cases, the position selected will depend upon other factors including the height, the visual acuity, and the personal preferences of the user of the apparatus.

All of the factors mentioned above are subject to change. For example, new copy may be substituted, ambient lighting conditions may change, the person using the apparatus may become fatigued, or a different person may use the apparatus.

Because of the importance of the problem, considerable attention has been given to it, and there are conventional devices for dealing with it. One such device comprises two pairs of arms. One pair is pivotally connected at one end to a first clamp bracket adapted to be secured to a support and at the other end to an adjustment bracket. The other pair of arms is pivotally connected at one end to a second clamp bracket adapted to support a copyholder or the like and at the other end to the same adjustment bracket. A single thumb knob control is provided at the point where one of the arms is pivotally connected to the adjustment bracket. To prevent the copy or lamp from sagging, notwithstanding tightening of the control knob, it is necessary to add tensioning springs to balance the weight of the apparatus. For example, each of a first pair of tensioning springs may have one end connected to the first clamp bracket and the other end connected to one of the arms of the first pair of arms mentioned above, and each of a second pair of tensioning springs may have one end connected to the adjustment bracket and the other end connected to an arm of the second pair.

The conventional solution is very useful and widely adopted, but the requirement for tensioning springs is obviously a drawback. Moreover, the position of the thumb knob precisely at the pivot between one of the arms and the adjustment bracket produces the result that the locking mechanism has a negligible mechanical advantage. A light accidental knock may be sufficient to cause unwanted repositioning of the copy or lamp even though the thumb knob is screwed down.

SUMMARY OF THE INVENTION

An object of the invention is to remedy the problems of conventional apparatus noted above and, in particular, to provide apparatus for supporting an object in a desired position which avoids the need for tensioning springs and which makes it possible to adjust the position of the object easily and accurately. Another object of the invention is to provide apparatus which reliably holds the object in a selected position despite accidental knocks resulting for example from an errant gesture by a user of the apparatus.

The foregoing and other objects are attained in apparatus comprising first bracket means adapted to be secured to a support, second bracket means adapted to support an object in a desired position, adjustment means, first arm means connecting the adjustment means to the first bracket means, and second arm means connecting the adjustment means to the second bracket means.

In accordance with the invention, the first and second arm means respectively comprise first and second pairs of arms, each arm of the first pair being pivotally connected at spaced-apart pivot locations to the first bracket means and the adjustment means, respectively, and each arm of the second pair being pivotally connected at spaced-apart locations to the second bracket means and the adjustment means, respectively. First control means is engageable with an arm of the first pair for selectively enabling and preventing pivoting movement thereof, and second control means is engageable with an arm of the second pair for selectively enabling and preventing pivoting movement thereof.

Accordingly, when the first and second control means both enable the respective pivoting movements, the second bracket means can be moved to a desired position, and, when the first and second control means both prevent the respective pivoting movements, the second bracket means retains its position.

Apparatus according to the invention is preferably characterized by a number of additional features, including the following:

Each of the first and second control means is also engageable with the adjustment means, and the adjustment means is formed with a pair of arcuate slots, a first of the slots describing an arc centered on a pivot location of the arm with which the first control means is engageable and a second of the slots describing an arc centered on a pivot location of the arm with which the second control means is engageable. The first and second control means comprise shaft means respectively guided in the slots.

Each of the first and second control means is formed with a threaded portion and with a control knob therefor, the knobs when turned in one direction enabling, and when turned in the other direction preventing, the respective pivoting movements.

The pivot locations of any one of the arms are spaced apart a distance equal to the distance between the pivot locations of the other arm of the same pair, and the pivot locations of the first and second pairs of arms are at the vertices of first and second parallelograms, respectively. The angular orientation of the second bracket means thus remains constant with changes in the position thereof. Preferably, the pivot locations of any one of the arms are spaced apart a distance equal to the distance between the pivot locations of any other arm.

BRIEF DESCRIPTION OF THE DRAWING

A better understanding of the invention may be gained from a consideration of the following detailed description of the preferred embodiments thereof, in conjunction with the appended figures of the drawing, wherein.

DESCRIPTION OF THE PREFERRED EMBODIMENTS

Figure 1:
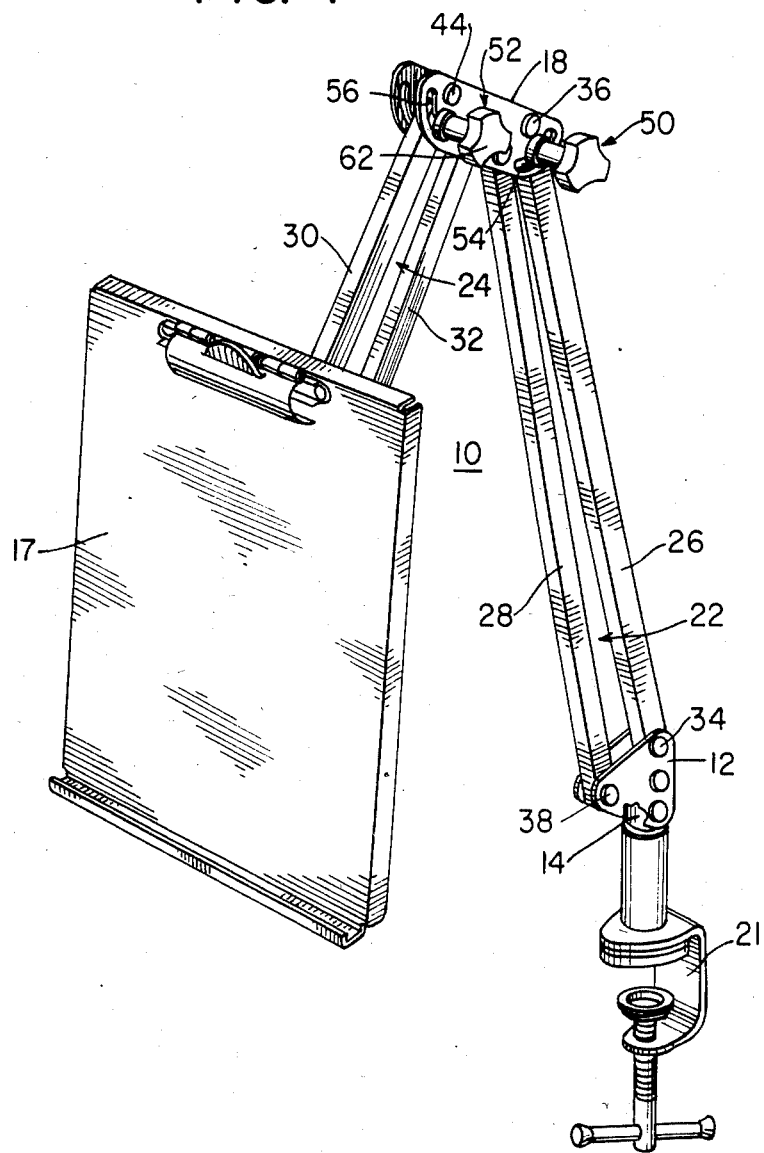
FIG. 1 is a perspective view of a preferred embodiment of apparatus constructed in accordance with the invention.
Figure 2:
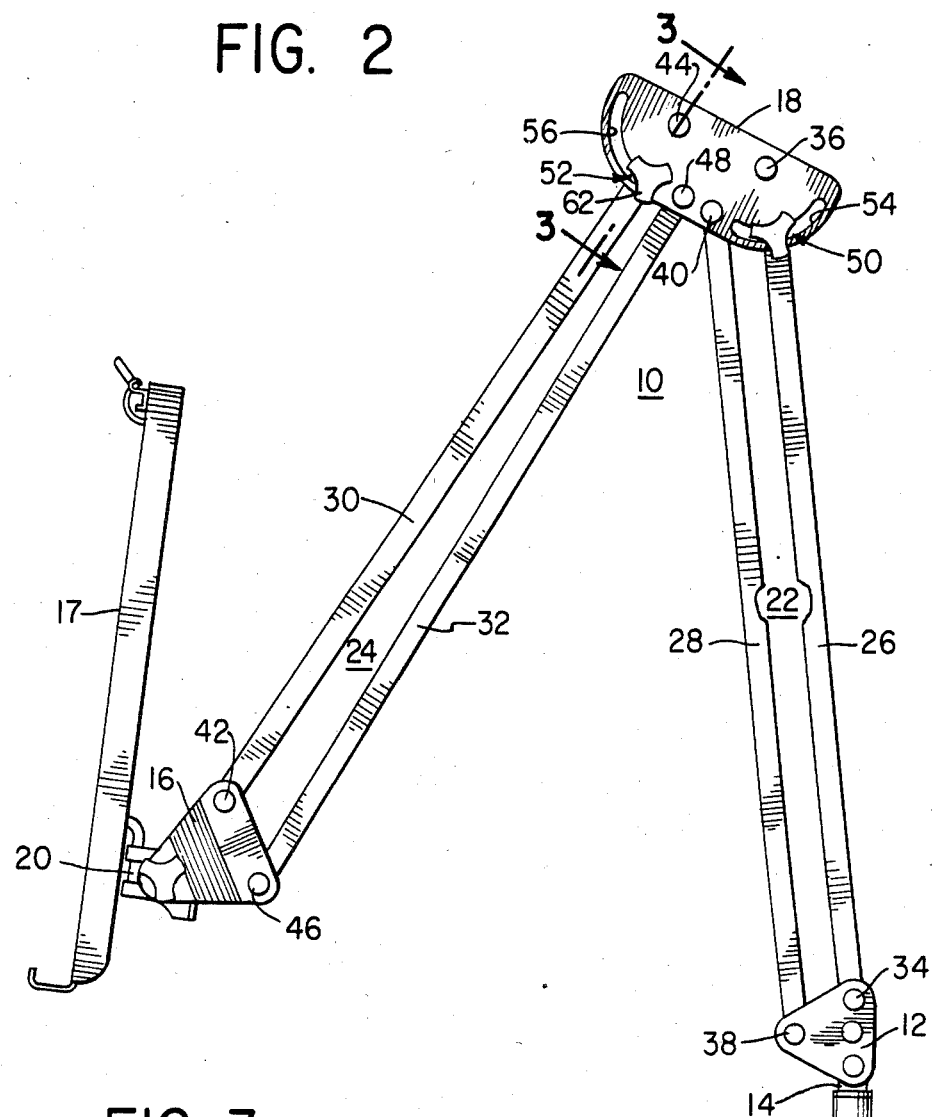
FIG. 2 is a side elevational view of the apparatus of FIG. 1.

FIGS. 1 and 2 show apparatus 10 constructed in accordance with the invention. It comprises first bracket means 12 adapted to be secured to a support such as a sleeve 14, second bracket means 16 (visible in FIG. 2) adapted to support an object such as a copyholder 17 in a desired position, and position adjustment bracket means 18. The second bracket means 16 is shown as directly supporting a pivot shaft 20 which in turn supports the copyholder 17 or a lamp, for example. The sleeve 14 is supported by a clamp 21 which can be secured to the top of a desk, table, or other suitable support.

First arm means 22 connects the adjustment means 18 to the first bracket means 12, and second arm means 24 connects the adjustment means 18 to the second bracket means 16.

In accordance with the invention, the first and second arm means 22 and 24 respectively comprise first and second pairs of arms. Thus the arm means 22 comprises an arm 26 and an arm 28, and the arm means 24 comprises an arm 30 and an arm 32. Each arm 26 and 28 of the first pair is pivotally connected at spaced-apart pivot locations to the first bracket means 12 and the adjustment means 18, respectively. Specifically, the arm 26 is pivotally connected at spaced-apart pivot locations 34 and 36 to the first bracket means 12 and the adjustment means 18, respectively, and the arm 28 is pivotally connected at spaced-apart pivot locations 38 and 40 to the first bracket means 12 and the adjustment means 18, respectively. A pivot stud at each pivot location passes through an arm and one of the bracket means or through an arm and the adjustment means to facilitate pivoting of the arm.

Similarly, each arm of the second pair of arms 30 and 32 is pivotally connected at spaced-apart pivot locations to the second bracket means 16 and the adjustment means 18, respectively. Thus the arm 30 is pivotally connected at pivot locations 42 and 44 to the bracket means 16 and the adjustment means 18, respectively, and the arm 32 is pivotally connected at pivot locations 46 and 48 to the bracket means, 16 and adjustment means 18, respectively.

First controllable locking or control means 50 is engageable with the arm 26 of the first pair of arms 26 and 28 for selectively enabling and preventing pivoting movement thereof, and second controllable locking or control means 52 is engageable with the arm 30 of the second pair of arms 30 and 32 for selectively enabling and preventing pivoting movement thereof.

Thus, when the first and second control means 50 and 52 both enable the respective pivoting movements, the second bracket means 16 can be moved to a desired position, and, when the first and second control means 50 and 52 both prevent the respective pivoting movements, the second bracket means 16 retains its position.

Figure 3:
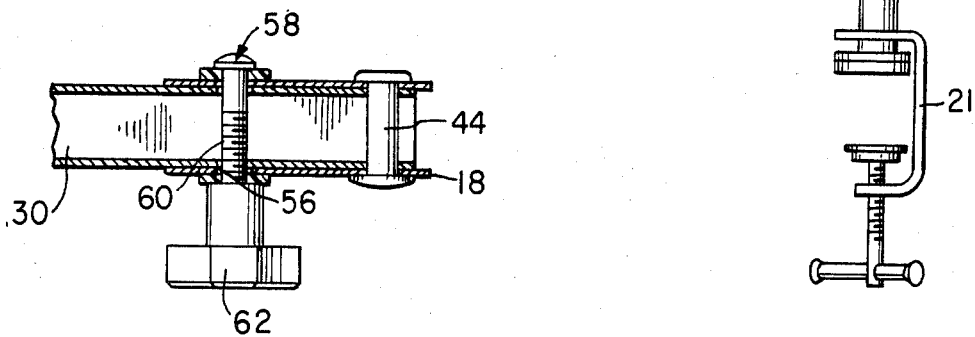
FIG. 3 is an enlarged sectional view along the line 3—3 of FIG. 2 and looking in the direction of the arrows.

Each of the first and second control means 50 and 52 is also engageable with the adjustment means 18. The adjustment means 18 is formed with a pair of arcuate slots 54 and 56. A first of the slots 54 describes an arc centered on the pivot location 36 of the arm 26 with which the first control means 50 is engageable, and a second of the slots 56 describes an arc centered on a pivot location 44 of the arm 30 with which the second control means 52 is engageable. The first and second control means 50 and 52 comprise shaft means 58 (FIG. 3) respectively guided in the slots.

Each of the first and second control means 50 and 52 is preferably formed with a threaded portion such as a pin 60 (FIG. 3) and with a control knob 62 having an interior thread (not shown) for engagement therewith, the knobs when turned in one direction enabling, and when turned in the other direction preventing, the respective pivoting movements. Since the control means 50 and 52 act at points spaced apart from the pivot locations, they have a greater mechanical advantage than the devices of the prior art described above, and apparatus according the invention is better able than the devices of the prior art to hold copy or a lamp, etc., in a desired position, despite accidental knocks.

The pivot locations of any one of the arms are preferably spaced apart a distance substantially equal to the distance between the pivot locations of the other arm of the same pair. For example, the distance between pivot locations 34 and 36 is the same as the distance between pivot locations 38 and 40; similarly, the distance between pivot locations 42 and 44 is the same as the distance between pivot locations 46 and 48. The pivot locations of the first and second pairs of arms are moreover substantially at the vertices of first and second parallelograms, respectively. That is, the pivot locations 34, 36, 40, 38 are at the vertices of a first parallelogram, and the pivot locations 42, 44, 48, 46 are at the vertices of a second parallelogram. The angular orientation of the second bracket means 16 thus remains constant with changes in the position thereof. Preferably, the two pivot locations of any one of the arms are spaced apart a distance equal to the distance between the two pivot locations of any other arm, and the first and second parallelograms described above are of the same size.

Thus there is provided in accordance with the invention a novel and highly-effective apparatus whereby the position of copy or of a lamp, etc., can be easily and accurately adjusted without the aid of tensioning springs or the like. Many other embodiments of the invention will readily occur to those skilled in the art upon consideration of this disclosure. For example, the first and second parallelograms described above need not be of the same size. Moreover, wing nuts may be substituted for the control knobs, different forms of clamp brackets may be employed, and the arcuate slots may be in any of the brackets or in any of the arms, so long as, by means cooperating with one slot, it is possible selectively to enable or prevent pivoting movements of the first pair of arms, and, by means cooperating with the other slot, it is possible selectively to enable or prevent pivoting movements of the second pair of arms. Accordingly, the invention is to be construed as including all structure which falls within the scope of the appended claims.

What is claimed is:

1. Apparatus for supporting an object in a desired position, comprising:

first bracket means adapted to be secured to a support;
second bracket means adapted to support said object;
first and second arm means including first and second pairs of arms, respectively, one end of each arm of said first pair being pivotally connected at spaced-apart pivot locations to said first bracket means and one end of each arm of said second pair being pivotally connected at spaced-apart pivot locations to said second bracket means, said spaced-apart pivot locations being without means on said first and second bracket means for securing said first and second pairs of arms against pivotal motion with regard to said first and second brackets;
position adjustment bracket means having the other ends of each arm of said first and second pairs of arms pivotally connected thereto at spaced-apart pivot locations, said adjustment bracket means forming first and second arcuate slots, the first slot describing an arc spaced from, but centered on, the pivot location on said adjustment bracket means for a first arm of said first pair of arms, the second slot describing an arc spaced from, but centered on, the pivot location on said adjustment bracket means for a first arm of said second pair of arms;
first controllable locking means having a shaft means guided in said first slot and being engageable with said adjustment bracket means and the first arm of said first pair of arms for selectively enabling pivoting movement thereof and preventing pivoting movement thereof with mechanical advantage and without the use of tensioning springs; and
second controllable locking means having a shaft means guided in said second slot and being engageable with said adjustment bracket means and the first arm of said second pair of arms for selectively enabling pivoting movement thereof and preventing pivoting movement thereof with mechanical advantage and without the use of tensioning springs, whereby stable positioning of the object is achieved.

2. Apparatus according to claim 1 wherein each of said first and second controllable locking means is formed with a threaded portion and with a control knob therefor, said knobs when turned in one direction enabling, and when turned in the other direction preventing, said respective pivoting movements.

3. Apparatus according to claim 1 wherein the pivot locations of any one of said arms are spaced apart a distance substantially equal to the distance between the pivot locations of the other arm of the same pair, whereby the pivot locations of said first and second pairs of arms are at the vertices of first and second parallelograms, respectively, and the angular orientation of said second bracket means remains constant with changes in the position thereof.

4. Apparatus according to claim 3 wherein the pivot locations of any one of said arms are spaced apart a distance substantially equal to the distance between the pivot locations of any other arm.

* * * * *